(12) United States Patent
Gold

(10) Patent No.: US 6,754,767 B2
(45) Date of Patent: Jun. 22, 2004

(54) SELF MANAGING FIXED CONFIGURATION RAID DISK IN HEADLESS APPLIANCE

(75) Inventor: Stephen Gold, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/810,171

(22) Filed: Mar. 19, 2001

(65) Prior Publication Data

US 2002/0101711 A1 Aug. 1, 2002

(30) Foreign Application Priority Data

Jan. 31, 2001 (GB) .............................................. 0102411

(51) Int. Cl.$^7$ .............................................. G06F 12/00
(52) U.S. Cl. .......................... 711/114; 711/4; 711/161; 711/162; 711/170; 711/173; 361/684; 361/685; 714/6; 714/7
(58) Field of Search .............................. 711/4, 114, 161, 711/162, 170, 173; 361/684, 685; 714/6, 7

(56) References Cited

U.S. PATENT DOCUMENTS

| | | | |
|---|---|---|---|
| 5,613,059 A | 3/1997 | Stallmo et al. | |
| 5,887,128 A | * 3/1999 | Iwasa et al. | 714/6 |
| 5,915,081 A | 6/1999 | Yamamoto et al. | |
| 6,378,038 B1 | * 4/2002 | Richardson et al. | 711/114 |

FOREIGN PATENT DOCUMENTS

| | | |
|---|---|---|
| EP | 0492808 A2 | 7/1992 |
| EP | 0709765 A2 | 5/1996 |
| EP | 0802485 A1 | 10/1997 |
| EP | 0967552 A2 | 12/1999 |
| EP | 1016967 A2 | 7/2000 |
| GB | 2341715 A | 9/1998 |

* cited by examiner

Primary Examiner—Mano Padmanabhan
Assistant Examiner—Jasmine Song
(74) Attorney, Agent, or Firm—Lowe Hauptman Gilman & Berner, LLP

(57) ABSTRACT

A headless computer entity comprises a RAID array data storage device. The headless computer entity contains a management application, capable of configuring said RAID data storage device from a blank unformatted condition into a plurality of RAID volumes, and maintaining said RAID data storage device when in operation under error conditions, and reconfiguring said RAID data storage device under conditions of replacement of a physical data storage component of said RAID array.

19 Claims, 17 Drawing Sheets

SELF MANAGING FIXED CONFIGURATION RAID DISK IN HEADLESS APPLIANCE

FIELD OF THE INVENTION

The present invention relates to the field of computer entities, and particularly although not exclusively, to "headless" computer entities which lack a conventional user interface having visual display unit, keyboard and the like.

BACKGROUND TO THE INVENTION

A conventional computer entity typically comprises a casing containing a processor, memory input/output ports and the like, a video monitor, a keyboard, and a tactile device for driving a graphical user interface, e.g. a mouse, trackball device or the like. Such prior art computers are well-known.

Another type of known computer entity is a headless computer entity, also called a "headless appliance". Headless computer entities are not directly administered as they do not have a conventional monitor, mouse or keyboard, to allow direct human intervention.

Headless computer entities have an advantage of relatively lower cost due to the absence of monitor, keyboard and mouse devices.

However, because headless computer entities do not have conventional user interfaces for human interaction, and generally do not have ports to which conventional keyboard or video monitors can be connected, headless computer entities are difficult to manufacture and maintain. It is particularly difficult to load operating systems and software into headless computer entities, and to make sure that the entity is self-correcting and reliable. These difficulties arise because maintenance of headless computer entities by an end customer is not practicable, and fixing of any faults requires a service call from a manufacturer or representative of the entity.

Prior art headless computer entities containing storage systems with a redundant array of inexpensive disks (RAID) require manual user configuration after the computer entity is installed and commissioned. Further, if a RAID volume fails, or a RAID card fails, prior art headless appliances require manual reconfiguration. This involves a service call from a manufacturer or servicing supplier.

Two main problems occur in the case of a headless computer entity having an array of disk drives, such as a RAID.

Firstly, there is the problem of how to actually manufacture the headless computer entity containing the plurality of disk drives, given that there is no console interface via which a human operator can configure the disk drives.

Secondly, having manufactured the headless computer entity, and logically configured that entity, there is the problem of maintaining the logical configuration of the RAID in the computer entity.

In a conventional server arrangement having a user console, after manufacture, a human administrator can configure a RAID to a required state, and then install an operating system into the RAID, followed by application programs and data.

Additionally, in a conventional computer entity having a user console with a video display unit, keyboard, pointing device and the like, a human administrator can reconfigure the logical configuration of the computer entity after installation, and attend to any error conditions which have occurred.

Neither of these options is available in a headless computer entity because there is no user console.

SUMMARY OF THE INVENTION

One object of the present invention is to provide a headless computer entity capable of self installation of an operating system which uses a fixed configuration RAID data storage device.

This may provide an advantage of easier installation of a RAID disk subsystem in the environment of a headless computer entity. A further advantage may include increased reliability by avoiding the possibility of user error in installation of the RAID disk configuration.

A second object of the present invention is to provide a fully self managing RAID disk subsystem which automatically creates and/or repairs a RAID disk configuration without any user intervention.

Because the headless computer entity is capable of self installation of an operating system, a RAID subsystem can be easily installed in a headless computer entity. A further advantage includes increased reliability by avoiding the possibility of user error in installation of the RAID configuration.

A second object of the present invention is to provide a fully self managing disk subsystem including a RAID, wherein the subsystem automatically creates and/or repairs a RAID configuration without any user intervention.

One aspect of the invention is directed to a method of manufacturing a headless computer entity having an array of plural physical data storage devices. The method includes introducing a partition structure into a first physical data storage device of the array of physical data storage devices. The partition structure is replicated to a second physical data storage device of the array to create a first data volume including the first and second physical data storage devices. The plural physical data storage devices are configured to create a second data volume, without erasing the partition structure. Replication of the first physical data storage device and the creation of the data volumes is controlled by an instruction set stored on the first physical data storage device.

Another aspect of the invention relates to a headless computer entity having (1) a redundant array device including plural physical data storage devices having a structural configuration, and (2) a management module for managing the structural configuration of the array of physical data storage devices. The array of plural physical data storage devices is configured into at least one RAID 1 volume and the management module is stored as program data in the RAID 1 volume.

A further aspect of the invention concerns a physical data storage device for use in a headless computer entity. The physical data storage device is capable of attaching in a redundant array of data storage devices having a structure configuration. The physical data storage device comprises (1) program data for managing the structural configuration of the redundant array of data storage devices, and (2) data implementing a driver for interfacing with the redundant array of data storage devices. The program data are arranged to configure the redundant array of data storage devices in response to the physical data storage device being installed in said array, without deleting itself.

Another aspect of the invention relates to a method of operating a headless computer entity including an array of plural physical data storage devices. The method includes (1) introducing a data storage device structural configuration management program to a first physical data storage device of the array, and (2) running the structural configuration management program to create plural data volumes across the plural physical data storage devices, without erasing the management program.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention can be practiced without limitation to these specific details. In other instances, well known methods and structures have not been described in detail so as not to unnecessarily obscure the present disclosure.

Figure 1:
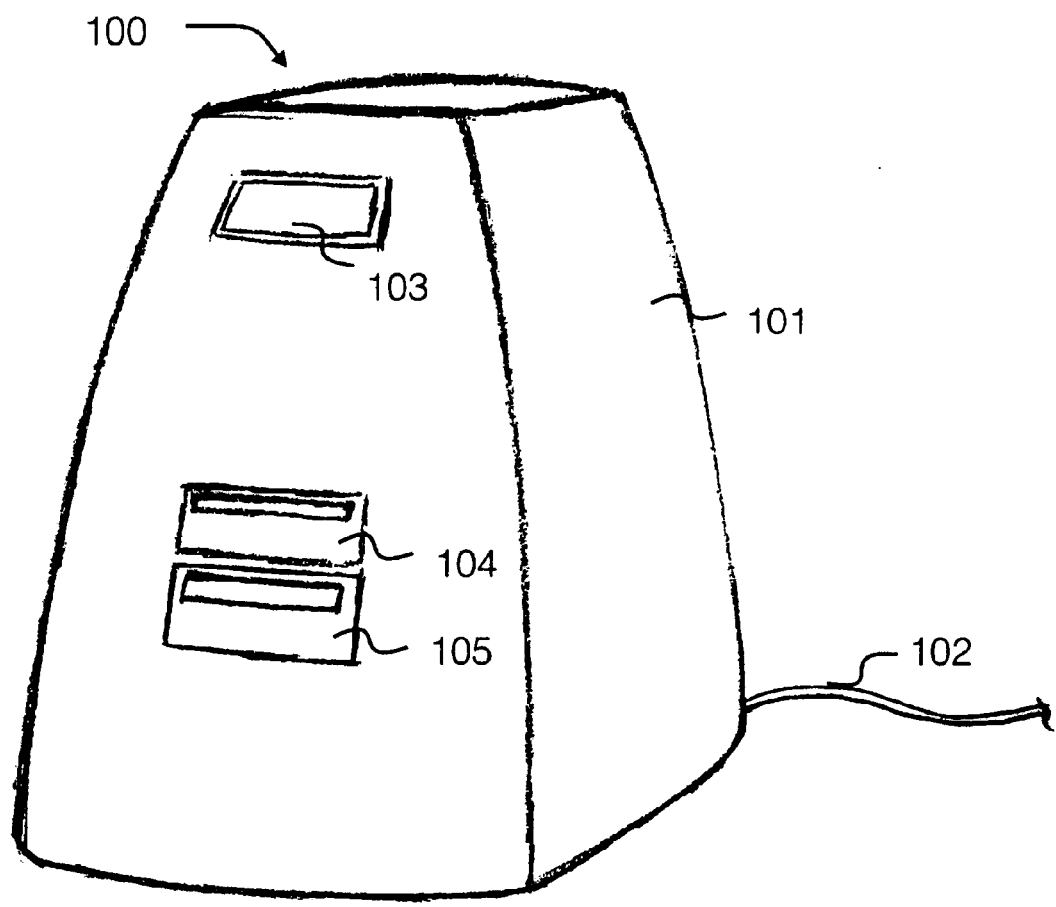
FIG. 1 is a schematic external view of a headless computer entity according to a specific implementation of the present invention.

Referring to FIG. 1 herein there is illustrated a perspective view of a headless computer entity 100. The headless computer entity can be configured to perform a specific computing task, for example as a network attached storage device (NAS). The headless computer entity comprises a casing 101, containing a processor, memory, data storage devices e.g. a hard disk, or a RAID array, or a disk mirror arrangement and a communications port connectable to a local area network cable 102; a small display, for example a liquid crystal display (LCD) 103 giving limited information on a status of the device, for example POWER ON, STANDBY or other modes of operation; optionally, a CD ROM drive 104, and optionally back-up tape data storage device 105. Otherwise the headless computer entity has no user interface, and is self-maintaining when in operation. Direct human intervention with the headless computer entity is restricted by the lack of user interface. In operation, the headless computer entity is intended to be self-managing and self-maintaining.

Figure 2:
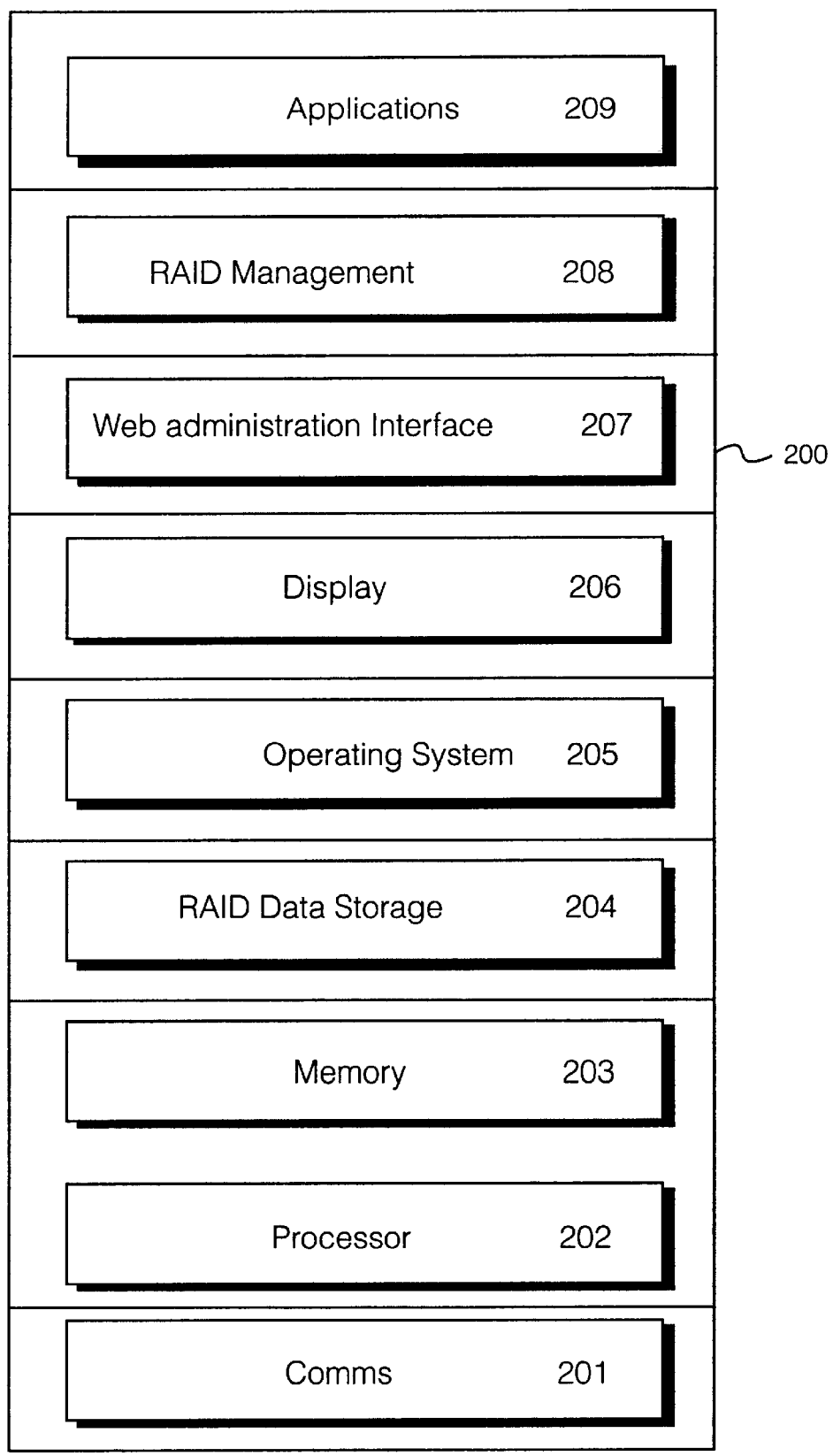
FIG. 2 is a schematic diagram of an internal component architecture of the headless computer entity containing hardware and logical components.

Referring to FIG. 2 herein, there is illustrated schematically physical and logical components of the computer entity 100. The computer entity comprises a communications interface 201, for example a local area network card such as an Ethernet card; a data processor 202, for example an Intel® Pentium or similar Processor; a memory 203, a data storage device 204, in the best mode herein an array of individual disk drives in a RAID (redundant array of inexpensive disks) configuration; an operating system 205, for example the known Windows 2000®, Windows95, Windows98, Unix, or Linux operating systems or the like; a display 206, such as an LCD display; an administration interface 207 by means of which information describing the status of the computer entity can be communicated to a remote display; a management module 208 for managing the data storage device 204; and plurality of applications programs 209.

The operating system includes a RAID driver which communicates with the RAID management card in the RAID device hardware. The RAID driver provides an application programming interface (API) through which various instructions can be sent to the RAID management card for causing the RAID management card to configure the array of physical disks into RAID volumes. Typically communication between the API and the RAID management card is by proprietary protocol.

The applications programming interface allows control of the RAID management card via a RAID driver by an application program. The pre-written application program is contained on the system disk, and is configured to manage the RAID data storage device in the specific implementation described herein according to the specific processes described herein.

Since the entire operating system and software are pre-installed on the headless computer entity, and there is no other way to install them, the operating system and applications, which includes the programs for setting up the RAID configuration, are installed before the RAID volumes are automatically configured.

This leads to the problem that creating a RAID 0, RAID 3, or RAID 5 volume causes all the data on the disks to be erased, since creating these RAID levels stripe, i.e., write, the data across a plurality of disks. Therefore, a RAID 1 mirror pair architecture is used for the system disk, and a more efficient RAID level, for example RAID 5, is used for the RAID data volume. The proposed RAID configuration is illustrated in FIG. 3 herein.

Figure 3:
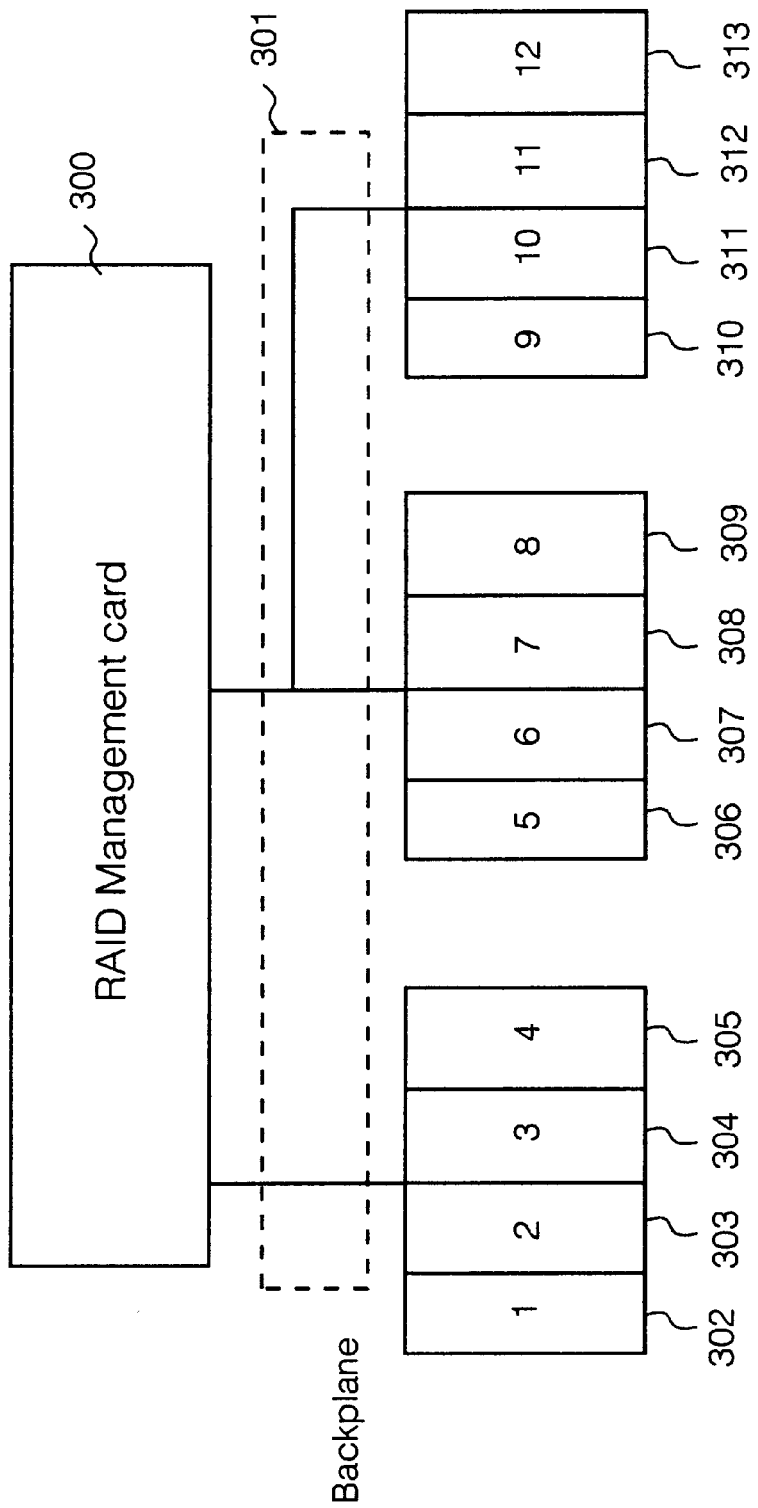
FIG. 3 is a schematic diagram of an arrangement of individual disk devices in a RAID configuration within the headless computer entity of FIGS. 1 and 2.

Referring to FIG. 3 herein, there is illustrated schematically a construction and configuration of the data storage device 204. The data storage device comprises a RAID management card 300 that is connected to a back plane 301. Card 300 and back plane 301 are on a physical structure having a plurality of bays. Each bay has physical locating structure and electrical connectors for connecting to an individual hard disk drive unit, such that plural hard disk drive units 302–313 fit into slots in corresponding respective bays of the back plane, and receive power supply and read/write signals from the back plane. The entire unit is managed by the RAID management card 300. RAID array devices are well known in the prior art.

The RAID management card 300 effectively abstracts the plurality of physical disks, and presents these disks as a plurality of logical RAID volumes to the operating system 205. The operating system communicates with the RAID card, which then provides data storage capacity to the operating system, configured as logical RAID volumes of data storage capacity. The RAID card converts the plurality of physical disks into a smaller number of logical RAID volumes.

When a newly manufactured RAID device is included in the headless computer entity and when the RAID card is initially powered up, the RAID card must be instructed on how to configure the RAID device into a plurality of RAID volumes.

Further, if there is a fault in the RAID device, either in the card or in one or more of the physical disk devices, the RAID management card must configure the physical disk drives into a RAID volume configuration suitable for the computer entity.

In the case of new manufacture of a headless computer entity, there is a problem in how the RAID management card configures the RAID volumes without human intervention during the manufacture process. Human intervention is not possible because of the lack of a user console.

In the case of failure mode, there is the problem of how to reconfigure the RAID device to minimize the loss of data and preserve user data where possible, bearing in mind the absence of administrator access, due to the lack of a user console.

Figure 4:
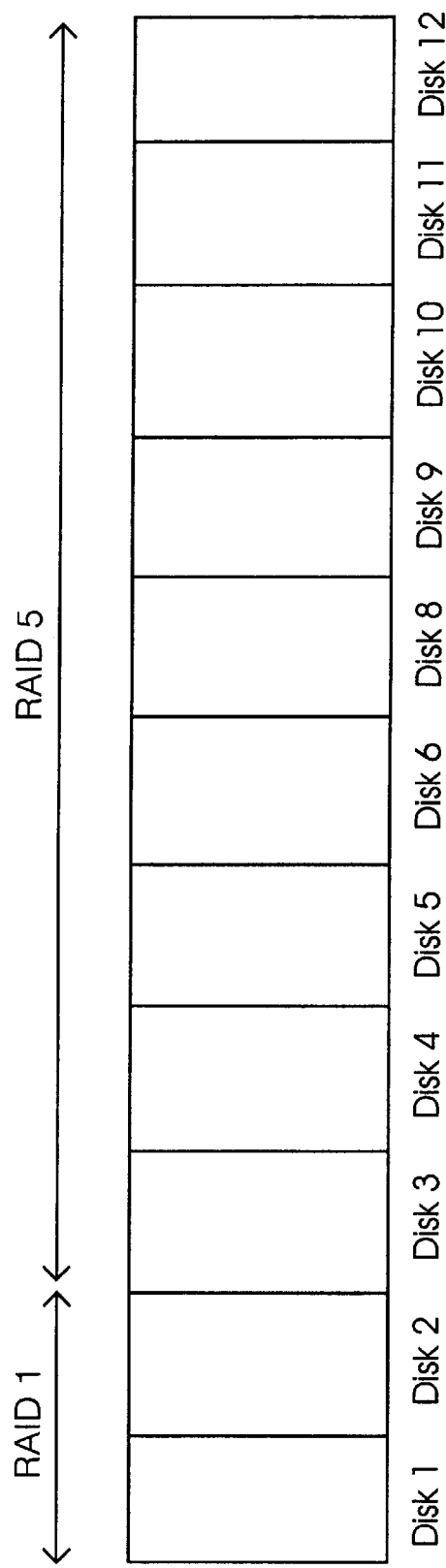
FIG. 4 is a schematic diagram of how a RAID volume is logically partitioned within the headless computer entity.

FIG. 4 is a diagram of an exemplary array of 12 disks in a RAID configuration for implementing data storage device 204. Although there are 12 individual physical disks, logically the disks constitute a single data storage capability divided into a system area, and a data area. This division needs to be set up during the manufacturing process of the headless computer entity.

The RAID device can be configured into different types of RAID volumes, having different levels of redundancy. In the example shown in FIG. 4, the RAID device is divided into a RAID 1 volume, and a RAID 5 volume. The RAID 1 volume comprises 2 physical disks 302, 303 whereas the RAID 5 volumes comprises the remaining 10 physical disks in the RAID device. The RAID 1 volume is assigned as a system area and the RAID 5 volume is assigned as a data storage volume and for storage of application data.

In the RAID array, all disks should have the same capacity. Otherwise, if one disk has a smaller capacity than the remaining disks, the configuration of the RAID volumes is limited by the capacity of the smallest disk.

Optionally, default application data can be copied from the system disk onto the RAID 5 volume configured as a data partition. The operating system back up area (OSBA) on the system disk contains a known good complete copy of a primary operating system, and default data sets for the primary data partition and secondary data partition. This application data can be copied from the OSBA onto the RAID 5 volume that is configured as a logical data storage partition. The application executable files remain in the operating system in the OSBA, whereas the application data reside in the RAID 5 volume secondary data partition. The RAID 5 volume secondary data partition can include a structured query language (SQL) server data base, for example one part of the data base might be on the logical system disk, whereas another piece of the data base might be on the logical data disk, arranged that way to enhance performance. The highest performance requirement items are stored on the logical system disk while the lower performance requirement items are stored on the logical data partition, because the RAID 1 configuration operates faster for writing data than the RAID 5 configuration. This can only be done if the RAID device is configured before other applications to configure the partitions on the RAID device run.

Because an administrator has no direct access to a headless computer entity via a user console, maintenance of the state and condition of the headless computer entity must be managed by the operating system, and application algorithms and routines of the computer entity itself. If the fundamental logical structure of the RAID fails, then a human operator cannot intervene via a user console to reconfigure the RAID.

Therefore, the RAID management module 208, which can be implemented either in the operating system and/or applications, must be capable of recreating the logical RAID under a wide range of error conditions.

Features of the self managing headless computer entity having a RAID include:

Ease of manufacturing a headless computer entity and installing an operating system and application programs before a logical RAID configuration is created.

Detection of when a RAID disk subsystem needs to be configured and selection of configuration processes depending upon the circumstances of the RAID disk subsystem. For example, if a RAID card has been replaced, a new card needs to be reconfigured to match a fixed RAID volume configuration without erasing the existing RAID volumes on the disks containing all data on the computer entity.

Handling a RAID data volume failure, and after repair of the RAID data volume, repairing a RAID configuration, but without erasing an operating system and applications which are used to perform the RAID configuration.

In a process for manufacturing the headless computer entity described herein, a system master disk comprising a known good master copy of the operating system is introduced into the data storage device 204 that contains a plurality of partitions.

Management of the RAID volumes is provided as a service by RAID management module 208. The service is activated by means of a service dependency call in the operating system installation routine, to ensure that the RAID management service starts first. The RAID management service does not report that it has started operating, until all RAID volume initialization is complete. A maximum time taken to start the RAID management service routine, including any services dependent upon the RAID management service, must be within a pre-set time (for example, optimally set at around 5 minutes) within which the hardware re-sets itself.

Figure 5:
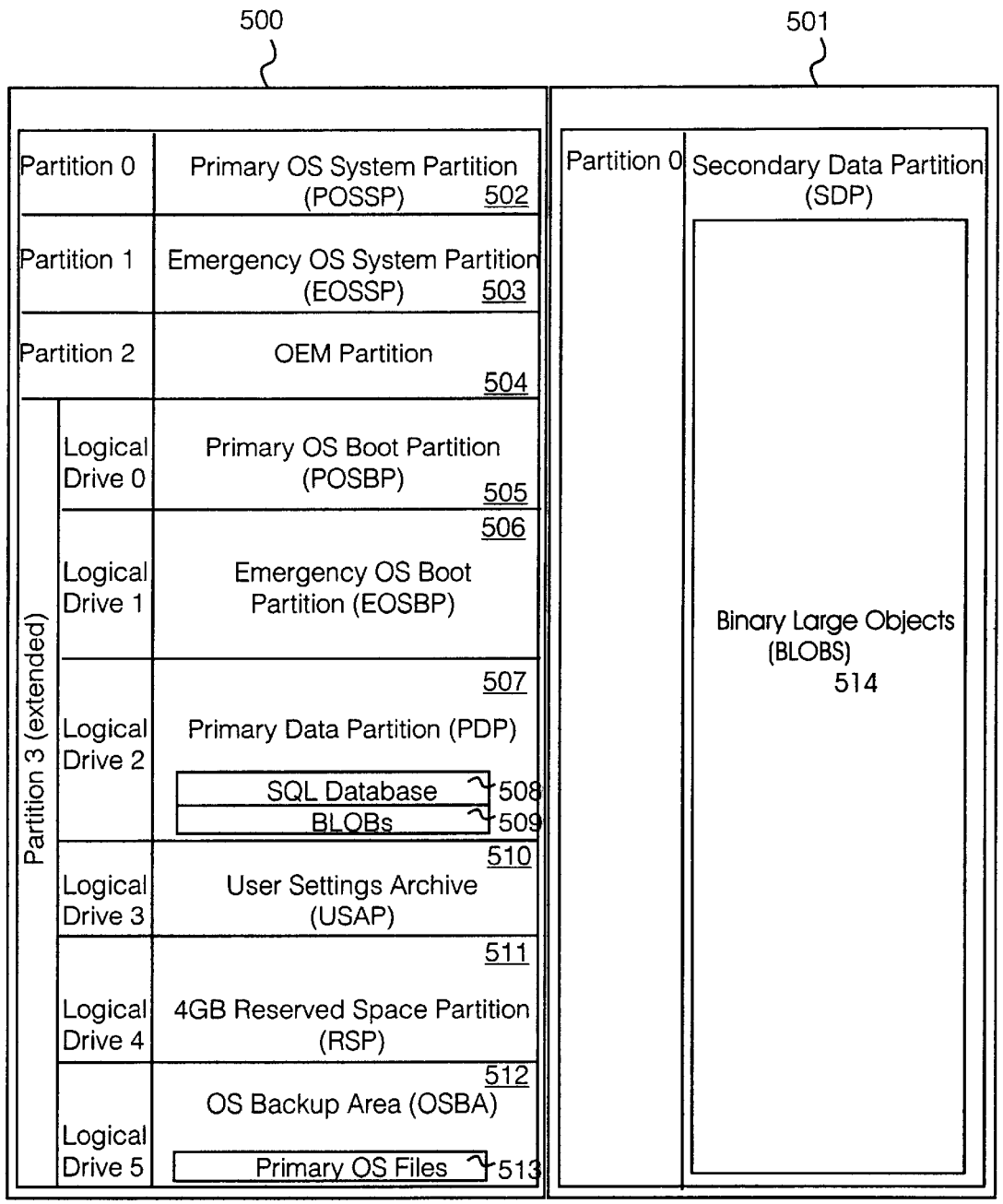
FIG. 5 is a schematic diagram of logical architecture of a RAID data storage device subsystem.

FIG. 5 is a schematic illustration of the format of data storage device 204, which stores one or more operating system(s) The data storage device is partitioned into a logical data storage area which is divided into a plurality of partitions and sub-partitions according to the architecture shown. The logical data storage area is divided into a primary partition 500 and a secondary partition 501. Within the primary partition are a plurality of sub partitions including a primary operating system system partition (POSSP) 502, containing a primary operating system of the computer entity; an emergency operating system partition (EOSSP) 503 containing an emergency operating system under which the computer entity operates under conditions where the primary operating system is inactive or is deactivated; an original equipment manufacturer (OEM) partition 504; a primary operating system boot partition (POSBP) 505, from which the primary operating system is booted or rebooted; an emergency operating system boot partition (EOSBP) 506, from which the emergency operating system is booted; a primary data partition (PDP) 507 containing an SQL data base 508, and a plurality of binary large objects (BLOBs) 509; a user settings archive partition (USAP) 510; a reserved space partition (RSP) 511 typically having a capacity on the order of 4 gigabytes or more; and an operating system back up area (OSBA) 512 containing a back up copy of the primary operating system files 513. The secondary data partition 501 comprises a plurality of binary large objects 514.

The RAID array configuration must be fixed, and automatically created, as part of the manufacturing process of the headless computer entity. Logical configuration of the RAID array must be achieved post-manufacture of the physical array.

During manufacture of the headless computer entity, a system disk is inserted into a bay of the RAID array. In the example of a RAID having 12 bays, each capable of containing a hard disk drive unit, the RAID device initially contains 11 blank disk drive units, and 1 disk drive unit containing a system disk, partitioned as illustrated in FIG. 5 herein.

Some types of RAID volume require that the RAID configuration is set, before data is stored in the RAID volume. For example in a RAID 5 volume, data is striped across a plurality of disk drives in a RAID array. This requires that the RAID 5 volume is configured, before the data is loaded onto the RAID 5 volume, because the data must be loaded onto each of a plurality of disks in the RAID 5 volume. In this case, a RAID 5 volume must be created before a system disk partitioning can be applied to that volume. This causes a problem in manufacturing, since the RAID volume must be configured before the system disk can be loaded on, but on the other hand it is the system disk which must do the configuring.

Therefore, in the implementation disclosed, the system disk is loaded into a RAID 1 volume which does allow copying of data onto itself before the RAID 1 volume is configured. A RAID 1 volume, comprises a pair of physical disk drives mirrored with each other to provide a logical RAID 1 volume. Of the six prior art levels of RAID, RAID level 1 allows a user to transfer data onto a physical disk, without configuring the physical disk into a RAID 1 volume beforehand. Configuration of a physical disk into a RAID 1 volume can be done after data has been loaded onto that physical disk, and without erasing that already loaded data. This is not true of the other five known RAID levels (RAID 2 to 6), since these all involve striping of data across a plurality of physical disks, which necessarily means either configuring the RAID volume before data is loaded onto that volume, or losing the data due to reconfiguration.

The manufacturing process configures the default RAID card settings to make a first disk of the RAID (system disk) into a boot on demand volume, so that on the first boot, the system boots from the first disk on the RAID array. The system disk is generated by cloning a master disk image containing an operating system and application programs. On first boot, the RAID management module automatically initializes the RAID volumes into the fixed configuration as shown in FIG. 4 herein. The RAID controller must be capable of background initialization, so that the RAID volumes are available for use by the computer entity immediately. The application programs detect a new blank logical data disk and then automatically create and format all data partitions.

Figure 6:
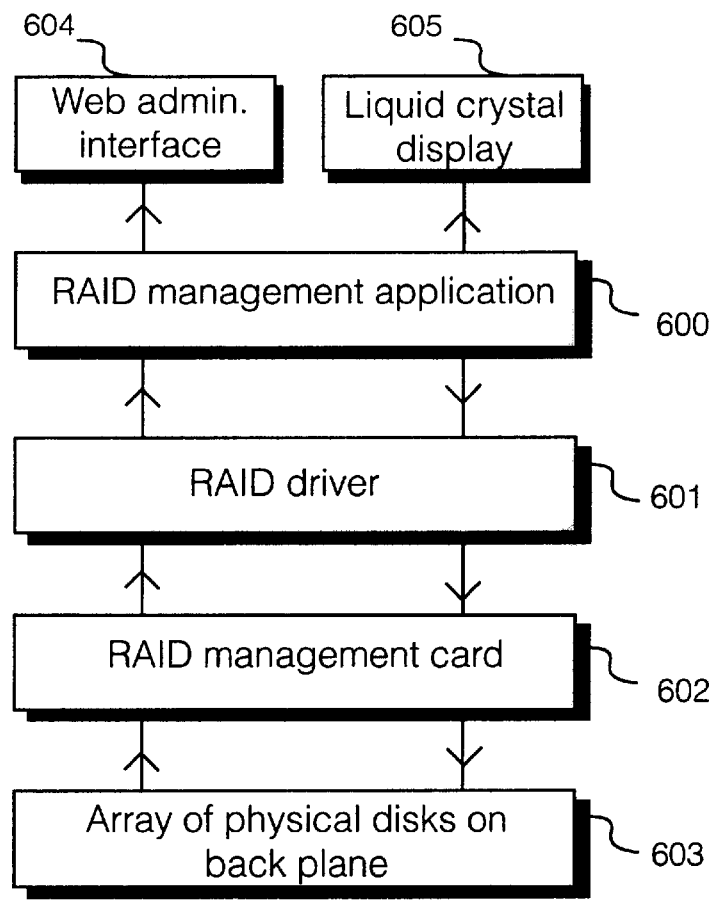
FIG. 6 is a schematic diagram of a control system of a RAID subsystem by a RAID management application via a RAID driver within the headless computer entity.

FIG. 6 includes schematic connections between a RAID management application and a RAID data storage subsystem for control of the RAID data storage subsystem, and between the RAID application and one or more display devices. The RAID management application 600 issues commands to a RAID management card 602 via a RAID driver 601, using an application procedure interface provided by the RAID driver 601. The RAID management application 600 can issue commands to the RAID management card for configuration of other RAID physical disks 603 on a back plane, and receive status information from the RAID management card 602 concerning the status of individual disks. The RAID management application 600 can generate displays supplied to (1) a liquid crystal display 605 mounted on a casing of the computer entity, and (2) a web administration interface 604 accessible remotely by one or more further computer entities.

The RAID management application is automatically started as part of the boot process of the operating system.

Figure 7:
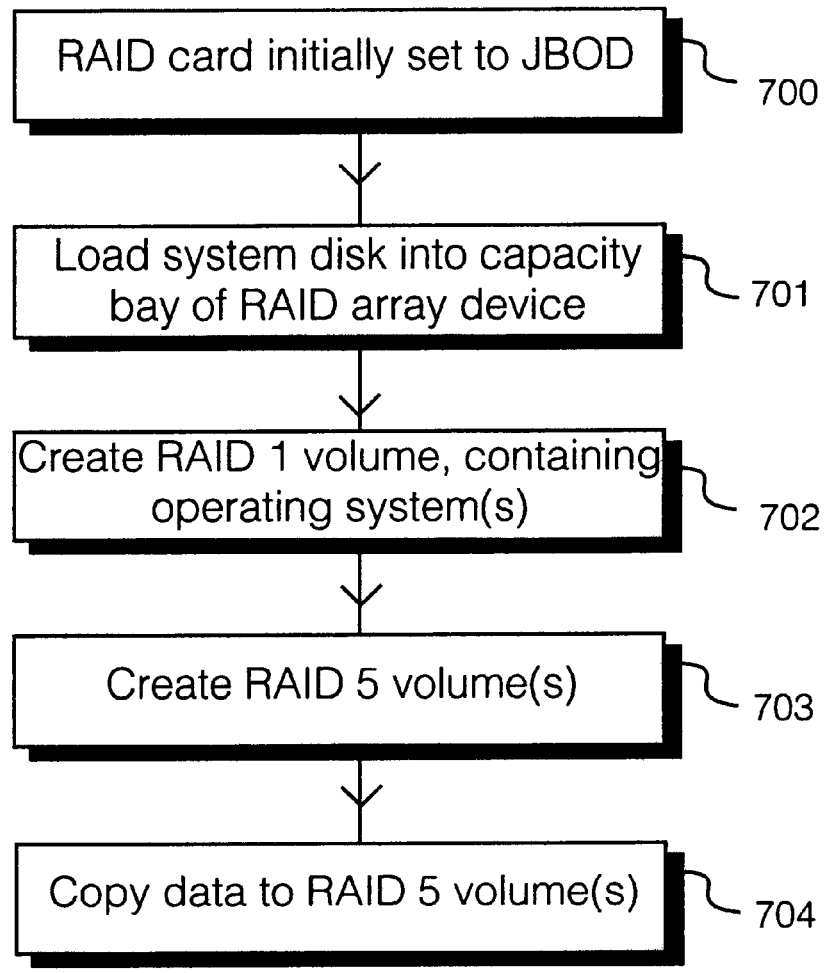
FIG. 7 is a flow diagram of a process for initial installation of a system disk into the headless computer entity, and configuration of and creation of RAID volumes, whilst preserving system disk partitions.

Referring to FIG. 7 herein, there is illustrated schematically process steps for converting a blank unformatted RAID device into a RAID 1 volume and one or more RAID 5 volumes as illustrated in FIG. 4 herein. In step 700, the RAID card initially is set to a JBOD (Just a Bunch Of Disks) configuration, in which no one physical disk of a plurality of disks of the RAID device is specifically formatted into a logical volume. In step 701, a physical disk drive loaded with a system disk partitioned as shown in FIG. 5 herein is loaded into a bay of the RAID device. In the example described herein, where there are 12 different bays, for 12 physical disks, during manufacture 11 bays are occupied by physical disks, and the system disk configured as shown in FIG. 5 is loaded into the first bay. In step 702, a RAID 1 volume is created by the RAID management module 208 from the partitioned disk itself, and one other physical disk. In the best mode, the disk in the next bay (bay 2) is selected to form the RAID 1 volume. At this stage, the system disk has replicated itself into a more redundant form in a RAID 1 volume. In step 704, any data contained in the secondary data partition 501 is copied into the RAID 5 volume from the RAID 1 volume. In step 703, one or more RAID 5 volumes are created from the remaining 10 physical disks in the array of disks. A secondary data partition 501 is assigned to the RAID 5 volume, so that in the arrangement shown in FIG. 4, two physical disks comprise a RAID 1 volume, and the remaining ten physical disks are configured into a RAID 5 volume.

The resultant RAID array comprising a RAID 1 volume and a RAID 5 volume is partitioned as in FIG. 5, where primary data partition 500 is assigned to a RAID 1 volume, and the secondary data partition 501 is assigned to a RAID 5 volume.

The RAID management module 208 instructs the RAID management card 300 to create a RAID 1 volume from the inserted system disk, and one other disk. Creation of the RAID 1 volume is handled by known processes and apparatus contained with the known RAID management card. The RAID management card effectively synchronizes the system disk with one other physical data disk to create the RAID 1 volume. The RAID management module must specify that the system disk is to be mirrored, not a blank disk. Otherwise, the RAID management card would wipe the system disk and replicate the blank disk.

If an application running on the headless computer entity uses a database, then a performance optimization may be to place the database transaction logs and the database tables on different logical disks. In this example, the transaction logs can be placed on a RAID 1 system disk and database tables can be placed on a RAID 5 data volume. However, when the computer entity is booted for the first time, the RAID 5 data disk might be blank, since the process of creating a RAID 5 volume erases those disks. Therefore, the management module 208 needs to create a database table on the RAID 5 data volume after this data volume is automatically created and formatted. When a master disk image of the system disk is created, it must be created on an appliance that has the RAID 5 data volume already created, so that when the applications are preinstalled onto the master disk, they will create a valid default database table on the RAID 5 data disk, which can then be copied on the operating system back up area.

After the management software creates and formats the RAID 5 volume, it moves the default application SQL database tables from the system disk operating system back up area to the newly created RAID 5 data volume.

The RAID hardware configuration can be fully automated and self managing, so that human administrators never have to manually create or repair a RAID volume configuration and initialization. This means that the RAID management programs running on the computer entity need to be able to run fully unattended, with no user interface except for a hardware failure alert message interface.

The RAID management module, in addition to initializing the default RAID volume configuration, is also responsible for repairing any RAID volume failures, for example where two disks in a RAID volume have failed.

The following failure types can occur:

Failure type 1: failure to first boot from factory default system disk. This first failure type is detected when the RAID management module has successfully initialized the default RAID volumes, in which case it then creates a file to indicate this state. If the system boots, and this file is missing, then the RAID management module detects that the computer entity is booting from a factory default disk.

Failure type 2: RAID 5 volume failure—single disk failed.

Failure type 3: RAID 5 volume failure, two or more disks failed.

Failure type 4: RAID 1 and/or 5 volume failure—as a result of RAID management card failure.

Failure type 5: Failure of four disks connected to second or third small computer system interface (SCSI) channels.

Figure 8:
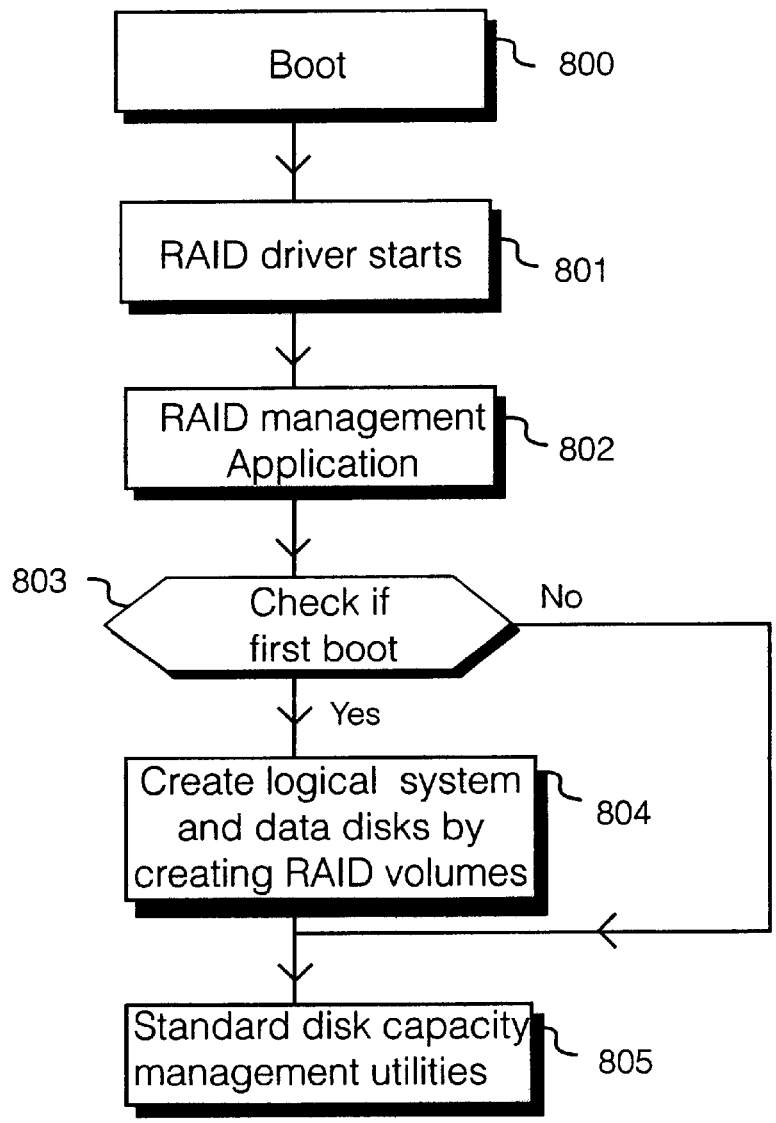
FIG. 8 is a flow diagram of process steps carried out by the RAID array management application, triggered by booting the headless computer entity.

Referring to FIG. 8 herein, there is illustrated schematically activation of the RAID management service as part of a boot of the operating system. FIG. 8 indicates the steps on initial boot of the operating system on initial installation, or on re-boot of the operating system at any time. In step 800, the operating system is booted. In step 801, the RAID driver starts. In step 802, the RAID management service takes control of the boot process before the boot process goes any further. In step 803, there is a check as to whether this is the first boot of the operating system. If the boot is the first boot of the operating system, then in step 804, a logical system of RAID volumes is created as described with reference to FIG. 4 herein. In step 805, a set of disk capacity management utilities is activated. If in step 803, the boot of the operating system is not the first boot, then the process proceeds directly to step 805 to start the disk capacity management utilities.

Figure 9:
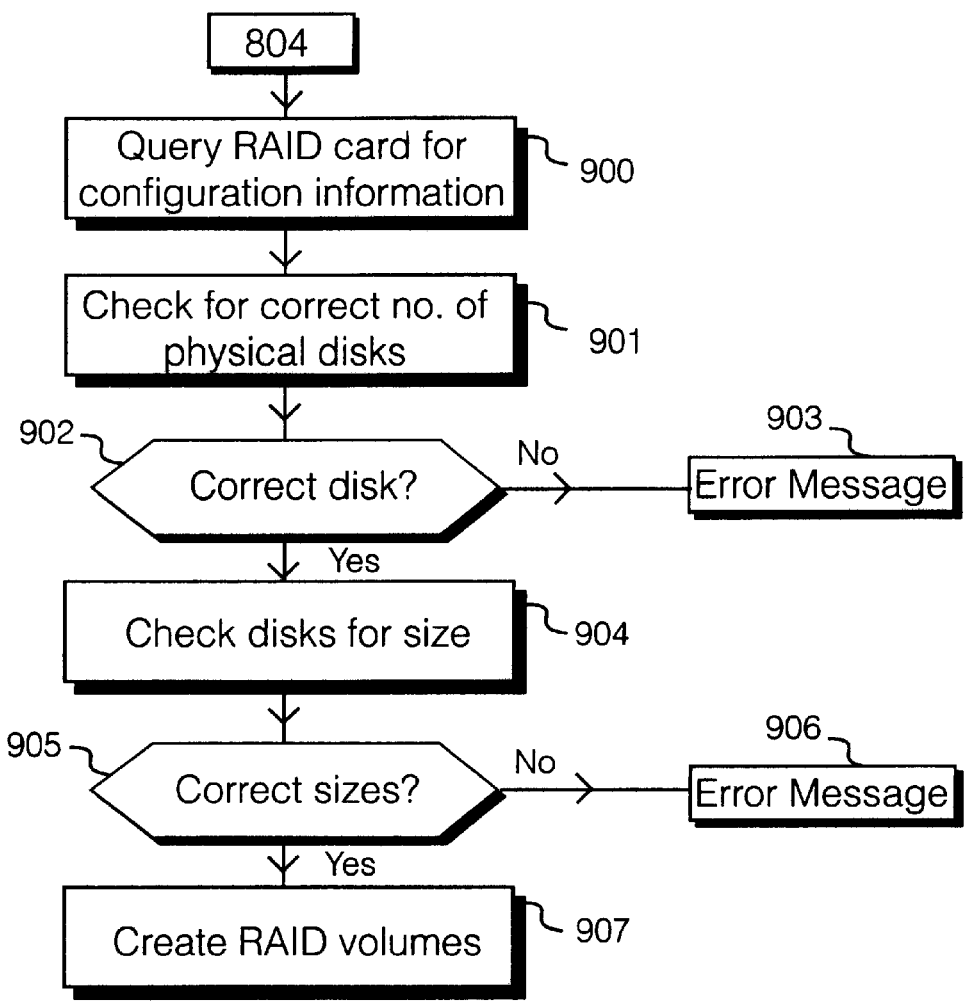
FIG. 9 is a flow diagram of a process for querying a RAID card for configuration information and data storage capacity.

Referring to FIG. 9 herein, there are illustrated schematically process steps carried out in step 804 for creating a logical system disk and data disks by creating RAID volumes. In step 900, the RAID management card is queried by the RAID management application, via the driver, for the configuration information, and the management application in step 901 checks that the correct number of physical disks are contained in the RAID device, by receiving status information from the RAID management card. If in step 902 the incorrect number of disks is found in the RAID device, then in step 903 an error message is posted to the web administration interface and/or liquid crystal display on the casing. The error message indicates that the RAID array does not contain the correct number of disks. However if a correct number of disks is found in step 902, the disk capacities are checked for size during steps 904 and 905. Steps 904 and 905 are also performed by the RAID management application querying the RAID management card via the RAID driver. If the correct sizes are not found in step 905, then in step 906 the RAID management application generates an error message which is posted to the web administration interface and/or liquid crystal display, to alert the user that the correct disk capacity is not present in the RAID device. However, if the correct disk capacity is found in step 905, then in step 907 the RAID management application proceeds to create RAID volumes.

Figure 10:
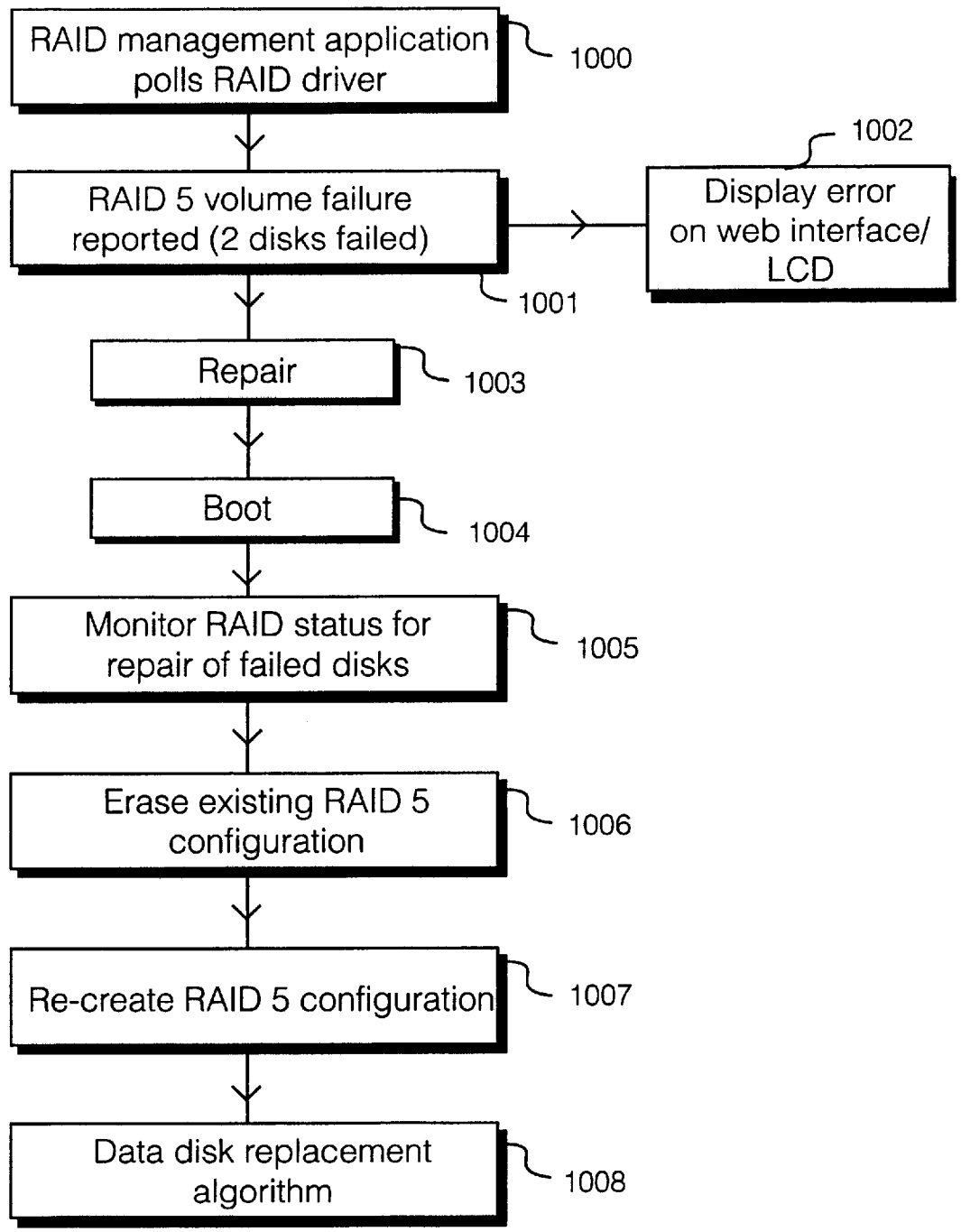
FIG. 10 is a flow diagram of process steps carried out by the RAID management apparatus for repairing a RAID 5 configuration within a RAID data storage device subsystem.

Referring to FIG. 10 herein, there is illustrated schematically process steps carried out by the RAID management service under conditions of a RAID 5 volume failure where two physical disks have failed. In step 1000, the RAID management service polls a RAID management card. In step 1001, a RAID volume failure is reported, in which two physical disks have failed. An error message is displayed on the web administration interface 207 and on the liquid crystal display 103 on the casing of the computer entity. In step 1003, the two failed disks are repaired as a result of human intervention, by replacement of physical disks in the bays of the RAID data storage device containing the failed physical disks. In step 1004, the operating system is re-booted, which results, in step 1005 of monitoring of the status of the previously failed disks in the RAID array. In step 1006, the previous RAID 5 configuration is erased, resulting in loss of data, and in step 1007 a new RAID 5 configuration is created, encompassing the replacement physical disks. In step 1008, the operating system runs a data disk replacement algorithm for replacement of the secondary data partition 501, onto the newly formed RAID 5 volume.

Figure 11:
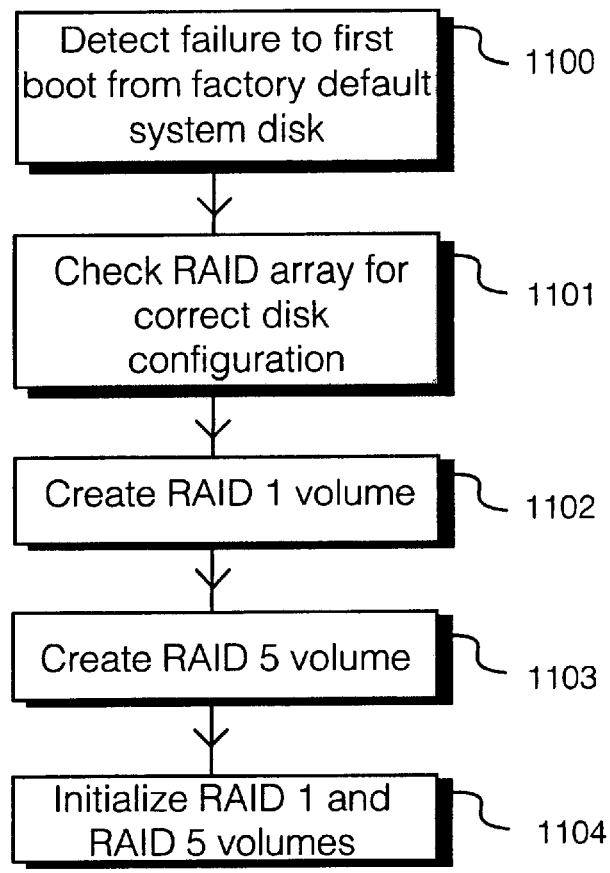
FIG. 11 is a flow diagram of process steps carried out by the RAID management module on detecting a failure to first boot from a factory default system disk for installing an operating system and configuring a RAID data storage system.

The first failure type of a RAID 1 volume failure triggers the recovery routine of FIG. 11.

Referring to FIG. 11 herein, on detecting a failure to first boot from a factory default system disk, in step 1100, the RAID management service checks the RAID array for a correct disk configuration in step 1101. An example of a correct disk configuration is where 12 equal sized hard disks are attached to three SCSI channels of the RAID card. If the correct disk configuration is found in step 1101, then in step 1102, a RAID 1 volume is created, and in step 1103, one or more RAID 5 volumes are created. In step 1104, the RAID 1 volume and RAID 5 volume(s) are initialized. Initializing the RAID 1 volume does not erase the system disk (disk 0).

Figure 12:
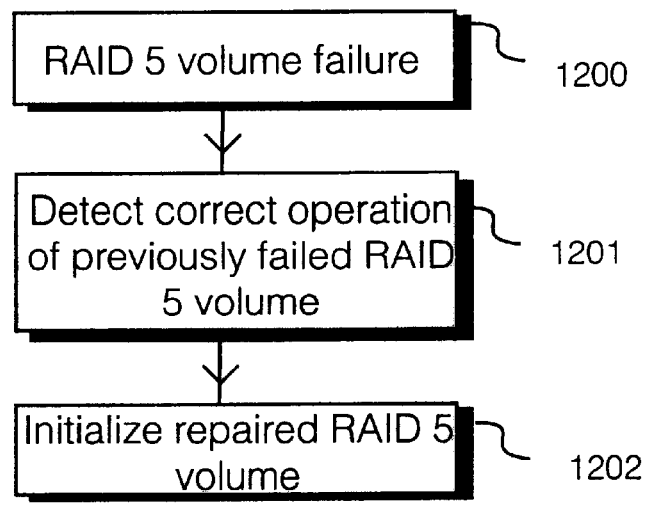
FIG. 12 is a flow diagram of process steps carried out by the RAID management module for detecting a repair of a RAID 5 volume.

FIG. 12 is a flow diagram of operations performed during a boot of the computer entity, on start up of the RAID management service if a previously failed RAID 5 volume is detected, as indicated by step 1200. If the previously failed volume is detected during operation 1201 as now operating correctly, the repaired RAID 5 volume is initialized during step 1202. In the example of the 12 disk RAID array, where 10 disks are assigned as a RAID 5 volume, then all 10 disks working correctly would constitute a correctly operating RAID 5 volume.

Figure 13:
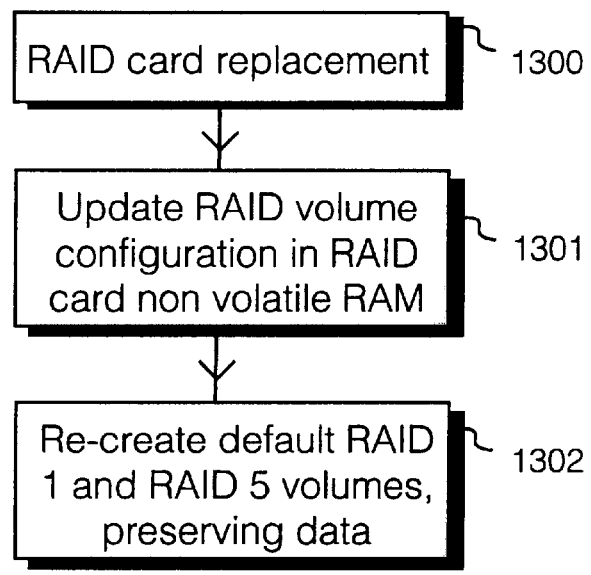
FIG. 13 is a flow diagram of process steps carried out by the RAID management module in response to a RAID card failure of a RAID data storage subsystem.

Referring to FIG. 13 herein, under a RAID card replacement failure type 1300, the RAID management service updates the RAID volume configuration in a non volatile random access memory of the RAID card in step 1301. In step 1302, the RAID management service recreates a default RAID 1 volume and the default RAID 5 volumes, without loss of data in these volumes.

In the event of a non-fatal RAID hardware failure, the RAID management module can display a set of hardware failure alert messages, on the status page of the web administration interface, and on the LCD 103 of the computer entity itself. Hardware failure causes display of a "critical severity" message on LCD 103.

Figure 14:
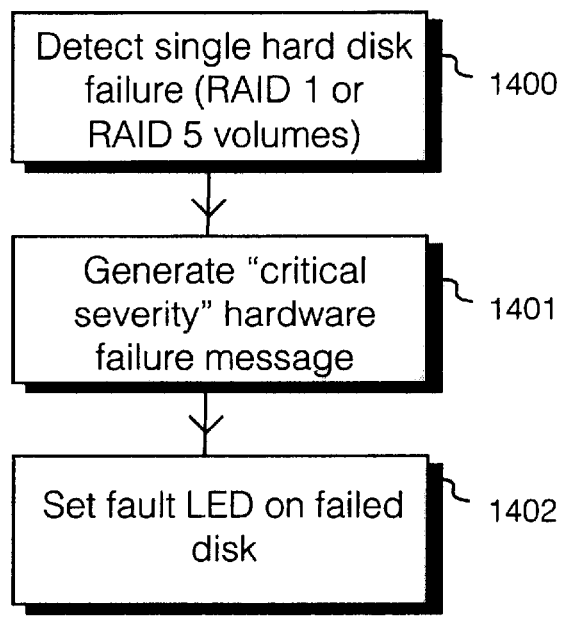
FIG. 14 is a flow diagram of process steps carried out by the RAID management module on detection of a single hard disk failure within the RAID subsystem.

FIG. 14 is a flow diagram if there is a single hard disk failure as a result of a single disk drive failing in either the RAID 1 or RAID 5 volumes (step 1400). Then, in step 1401, an alert message is generated by the RAID management service. The alert message contains information describing which specific disk has failed, and that no data has been lost, but the computer entity is vulnerable until the failed disk is replaced. In step 1402, the RAID management service activates an LED on the failed disk to indicate the disk has a fault condition, so that the failed disk can be easily visually identified.

Figure 15:
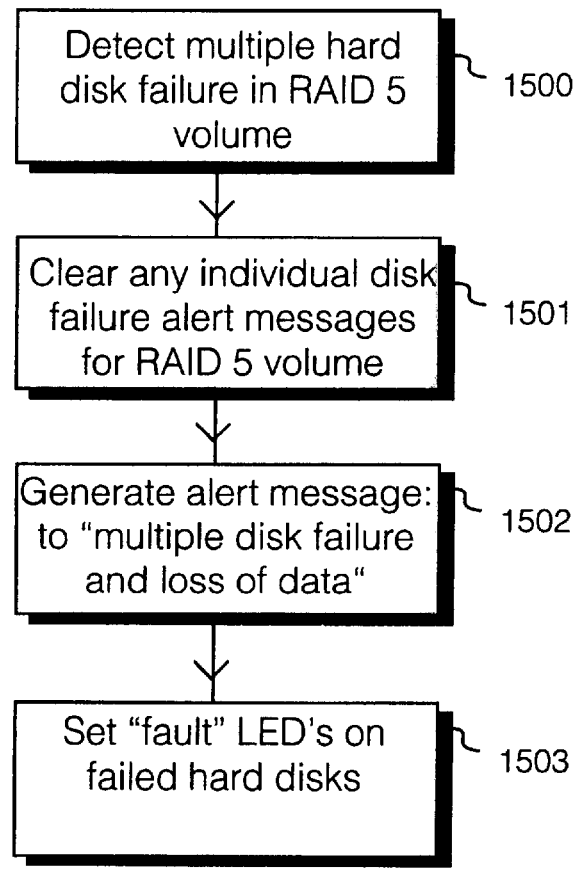
FIG. 15 is a flow diagram of process steps carried out by the RAID management module on detection of multiple hard disk failures in a RAID 5 volume.

Referring to FIG. 15 herein, there is illustrated schematically process steps carried out by the RAID management service when a RAID volume failure is detected. In step 1500, a multiple hard disk failure in the RAID 5 volume is detected. A multiple hard disk failure includes two or more hard disks of the RAID 5 volume. In step 1501, any individual disk failures for which alert messages have previously been generated are cleared for the RAID 5 volume. The alert message for a RAID 1 volume failure is not cleared. In step 1502, an alert message is generated and displayed on the web interface, and/or LCD 103 on the computer entity casing; the alert message contains information that there is a multiple disk failure, and that there is loss of data. The alert also contains information identifying which specific disks have failed. In step 1503, the RAID management service sets an individual fault light emitting diode (LED) on each of the hard disks which have failed, to enable easy identification of those hard disks by maintenance personnel.

Figure 16:
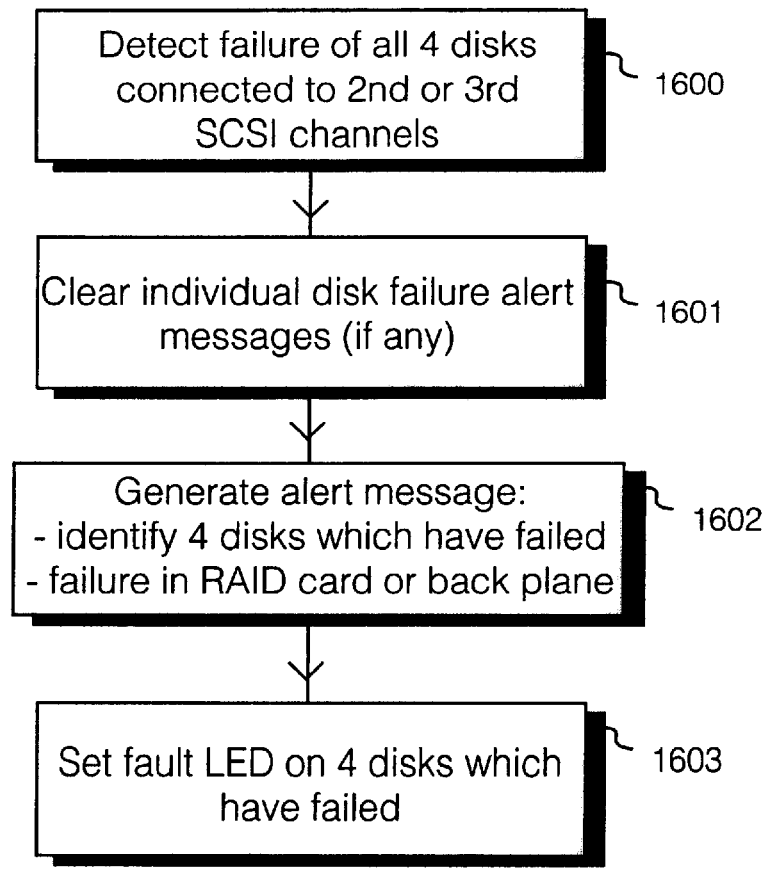
FIG. 16 is a flow diagram of process steps carried out by the RAID management module on detection of failure of 4 disks connected to a second or third small computer system interface (SCSI) channel.

Referring to FIG. 16, herein, there is illustrated schematically process steps carried out by the RAID management service when a RAID SCSI channel failure is detected. The RAID management service detects, in step 1600, if there is a failure of all four disk drives that are connected to either a second or third SCSI channel on the RAID card. Detection of such a failure could indicate either a failure of that SCSI channel on the RAID card, or a failure of the SCSI-IDE back plane connected to that SCSI channel. In this case, any individual disk failure alert messages which are currently displayed on the web interface or LCD on the computer entity casing are cleared in step 1601. Then during step 1602, a new alert message is generated containing the information to identify which of the individual four disks have failed. The new alert message also contains a message that the failure could be due to a failure in the RAID card or in the back plane hardware, rather than those actual disk drives. In the case where the failure is in the RAID card or in the back plane, then the user's data are not lost. However, if the failure is in the four disks themselves, then data are lost. The RAID management service, in step 1603, sets a fault LED on each of the four failed disks, to enable maintenance personnel to identify those disks.

Figure 17:
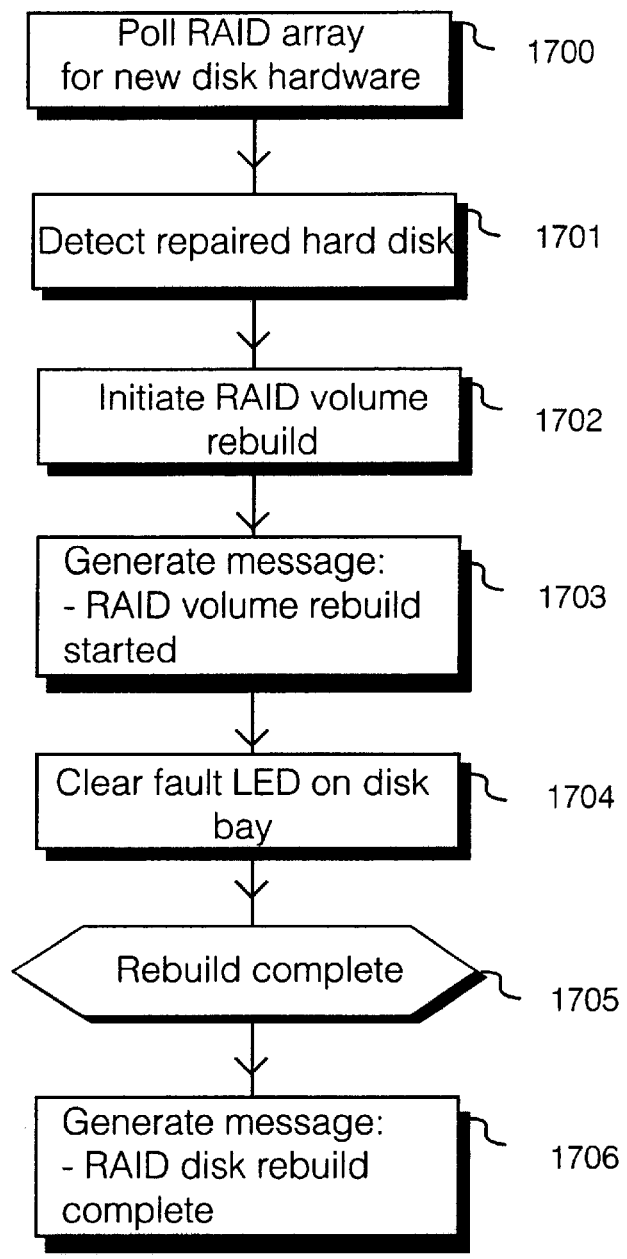
FIG. 17 is a flow diagram of process steps carried out by the RAID management module for RAID configuration rebuild.

Referring to FIG. 17 herein, when a failed disk is repaired by a maintenance person inserting a new disk device into a hot swap bay, as indicated by an illuminated fault LED on the bay, the RAID management service, due to an automatic ongoing poll of the RAID array from the new disk hardware in step 1700, detects the repaired hard disk in step 1701. The service initiates a RAID volume rebuild in step 1702 by separate routine. In step 1703, the RAID management service generates a message which is displayed on the web interface and/or LCD 103, that a RAID volume rebuild has started. In step 1704, the service resets the fault LED on the bay of the disk which has been replaced. In step 1705, on receiving a message from the RAID volume rebuild routine, the RAID management service generates a message in step 1706, that the RAID disk rebuild is complete. This message is displayed on the web interface and/or the LCD 103.

What is claimed is:

1. A method of manufacturing a headless computer entity, said entity comprising an array of a plurality of physical data storage devices, said method comprising the steps:

introducing a partition structure into a first physical data storage device of said array of physical data storage devices;

replicating said partition structure to a second physical data storage device of said array to create a first data volume comprising said first and second physical data storage devices;

configuring said plurality of physical data storage devices to create a second data volume, without erasing said partition structure; and controlling said replication of said first physical data storage device and said creation of said data volumes by an instruction set stored on said first physical data storage device.

2. The method as claimed in claim 1, wherein said first physical data storage device creates a mirror image of itself as a RAID 1 volume.

3. The method as claimed in claim 1, further comprising the step of:

generating instructions that identify at least one bay on a back plane of said array of plurality of physical data storage devices, that signify a faulty data storage device.

4. The method as claimed in claim 1, further comprising the step of transferring application data from an operating system back up area on said first physical data storage device onto a logical RAID data storage volume.

5. A headless computer entity comprising:
- a redundant array device comprising a plurality of physical data storage devices having a structural configuration;
- a management module for managing the structural configuration of said array of physical data storage devices;
- said array of a plurality of physical data storage devices being configured into at least one RAID 1 volume, wherein said management module is stored as program data in said RAID 1 volume.

6. The headless computer entity as claimed in claim 5, wherein said management module is arranged to operate without human user intervention to automatically configure said redundant array of data storage devices.

7. The headless computer entity as claimed in claim 5, wherein said management module is arranged to generate an instruction to identify at least one bay on a back plane of said redundant array device containing a faulty or absent data storage device.

8. The headless computer entity as claimed in claim 5, wherein said array of physical data storage devices comprises a management card for receiving commands from said management module, said management card being configured to boot from a predetermined bay on a back plane of said redundant array device.

9. The headless computer entity as claimed in claim 5, wherein said management module is permanently assigned to a lowest SCSI identification on a first bus of the RAID management card.

10. The headless computer entity of claim 5, wherein the management module is arranged for managing the structural configuration without managing the data of said array.

11. A physical data storage device for use in a headless computer entity, the physical data storage device being capable of attaching in a redundant array of data storage devices having a structure configuration, said physical data storage device comprising:
- program data for managing the structural configuration of said redundant array of data storage devices;
- data implementing a driver for interfacing with said redundant array of data storage devices;
- said program data being arranged in operation to configure said redundant array of data storage devices in response to said physical data storage device being installed in said array, without deleting itself.

12. The physical data storage device of claim 11, wherein the program data are arranged for managing the structural configuration without managing the data of said array.

13. A method of operating a headless computer entity, said entity comprising an array of a plurality of physical data storage devices, said method comprising the steps:
- introducing a data storage device structural configuration management program to a first physical data storage device of said array; and
- running said structural configuration management program to create a plurality of data volumes across said plurality of physical data storage devices, without erasing said management program.

14. The method as claimed in claim 13, further comprising the steps of:
- introducing a partition structure to said first physical data storage device of said array, said partition structure comprising a primary partition structure and a secondary partition structure;
- assigning said primary partition to a first RAID volume; and
- assigning said secondary partition structure to a second RAID volume.

15. The method as claimed in claim 13, wherein said plurality of data volumes comprise at least 2 RAID data volumes.

16. The method as claimed in claim 13, wherein said step of creating a plurality of data volumes comprises:
- creating a RAID 1 volume; and
- creating a RAID 5 volume.

17. The method as claimed in claim 13, further comprising the steps of:
- replicating said management program onto a second physical data storage device of said array; and
- forming a RAID volume from said first and second physical data storage devices.

18. The method as claimed in claim 13, further comprising the step of:
- generating an alert message data describing a type of fault concerning at least one said data storage device of said array.

19. The method of claim 13, wherein the data storage device structural configuration is introduced without managing the data of said array.

* * * * *